United States Patent [19]

Hurley

[11] 4,215,537

[45] Aug. 5, 1980

[54] APPARATUS FOR AND METHOD OF SUPPRESSING INFRARED RADIATION EMITTED FROM GAS TURBINE ENGINE

[75] Inventor: John F. Hurley, Easton, Conn.

[73] Assignee: Avco Corporation, Stratford, Conn.

[21] Appl. No.: 928,446

[22] Filed: Jul. 27, 1978

[51] Int. Cl.³ .............................. F02C 7/18; F02K 1/26
[52] U.S. Cl. ...................................... 60/264; 60/39.5; 239/127.3; 239/265.17; 239/265.19
[58] Field of Search ................. 60/204, 264, 265, 266, 60/271, 39.5, 39.66; 239/127.3, 265.17, 265.19

[56] References Cited

U.S. PATENT DOCUMENTS

| | | | |
|---|---|---|---|
| 4,007,587 | 2/1977 | Banthin et al. | 60/204 |
| 4,018,046 | 4/1977 | Hurley | 60/264 |
| 4,095,417 | 6/1978 | Banthin | 60/39.5 |

Primary Examiner—Stephen C. Bentley
Attorney, Agent, or Firm—Ralph D. Gelling

[57] ABSTRACT

An apparatus for and method of suppressing infrared radiation emitted from hot metal parts at the aft end of a gas turbine engine and from the exhaust gas plume thereof are provided and such apparatus comprises a dual purpose ejector vane assembly operatively associated with the engine for introducing cooling ambient air into the hot engine exhaust gases and hiding the hot metal parts wherein the assembly comprises a tubular duct structure comprised of two cooperating portions defined by an upstream portion and a downstream portion with the upstream portion having a discharge end of a particular area and the downstream portion having an inlet end provided with an inlet area which is larger than the particular area to define an annular space therebetween for receiving cooling ambient air therethrough by ejector action during operation of the engine, and one of the portions has at least one vane providing at least one stream of cooling ambient air by ejector action completely across the duct structure which serves to break the exhaust gases confined thereby into a plurality of separate exhaust gas streams and provide mixing of the one stream with the exhaust gases completely across the duct structure and wherein the assembly provides a substantial amount of cooling ambient air with maximum air film cooling of metal parts of the assembly and maximum dilution of the exhaust gas plume for a minimum infrared signal.

23 Claims, 12 Drawing Figures

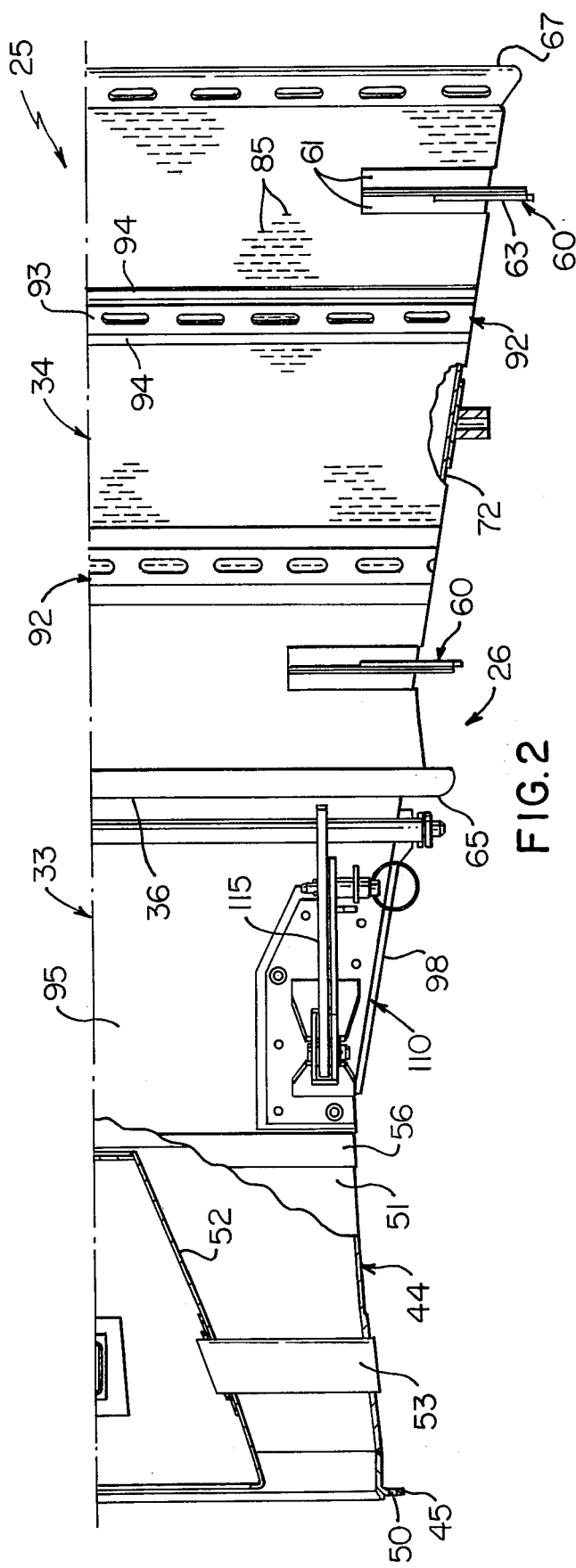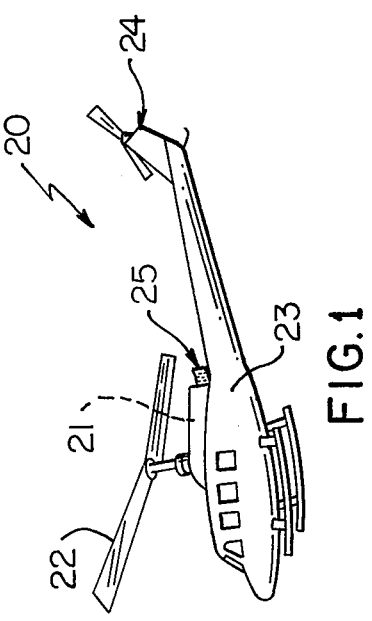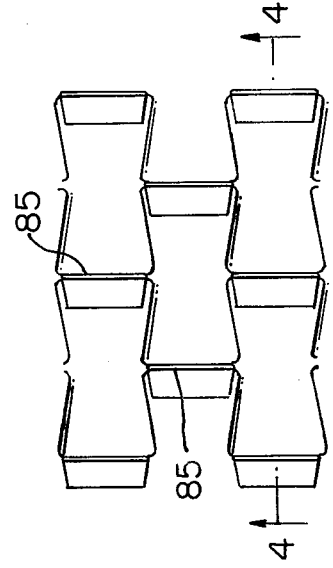

APPARATUS FOR AND METHOD OF SUPPRESSING INFRARED RADIATION EMITTED FROM GAS TURBINE ENGINE

BACKGROUND OF THE INVENTION

Many military vehicles, such as aircraft, for example, are powered by gas turbine engines wherein each of such engines emits infrared radiation from hot metal parts thereof and from its exhaust gas plume making the associated vehicle particularly vulnerable to missiles which seek and home on such infrared radiation in an effort to destroy the vehicle.

Because of deficiencies of many of the previously proposed infrared radiation suppressors and as outlined in U.S. Pat. No. 4,007,587, it was proposed in this patent to provide an apparatus for and method of suppressing infrared radiation which utilizes fixed though adjustable components in a duct structure which is basically a one-part structure. However, the one-part structure disclosed by this patent is difficult to mount or install in a vehicle, requires additional vibration isolation bellows and flanges resulting in added weight, and does not provide maximum film cooling of metal surfaces of the apparatus.

It has also been proposed in U.S. Pat. No. 4,018,046 to provide an apparatus for and method of suppressing infrared radiation employing two separate main parts defined by an ejector vane assembly having radially disposed vanes and a dogleg duct wherein cooling ambient air is also introduced through an annular passage between the vane assembly and dogleg duct. However, the apparatus and method of this latter patent do not provide mixing of one or more streams of cooling ambient air with hot engine exhaust gases such that the hot gas stream is effectively split across its full dimension so as to produce a highly efficient mixing of cooling ambient air with hot exhaust gases and a cooler exhaust gas plume; and do not provide maximum air film cooling of metal parts.

Accordingly, it is a desired objective to provide an apparatus for and method of suppressing infrared radiation emitted from hot metal parts at the aft end of a gas turbine engine and from the exhaust gas plume thereof which utilizes an assembly of a plurality of fixed cooperating component parts wherein the assembly provides a substantial amount of cooling ambient air with maximum air film cooling of metal parts of such assembly and maximum dilution of the exhaust gas plume for a minimum infrared signal.

SUMMARY

It is a feature of this invention to provide an apparatus for and method of suppressing infrared radiation which accomplish the above-stated desired objective.

Another feature of this invention is to provide an apparatus for and method of suppressing infrared radiation utilizing a duct structure comprised of two cooperating parts or portions wherein at least one of such portions introduces at least one stream of cooling ambient air completely thereacross to break the exhaust gases confined thereby into a plurality of streams and wherein a tubular blanket of cooling ambient air is introduced between the two portions.

Another feature of this invention is to provide an apparatus for and method of suppressing infrared radiation of the character mentioned which employs a duct structure comprised of two tubular portions defined by an upstream portion and a downstream portion and the upstream portion employs substantially V-shaped vanes while the downstream portion employs substantially tubular vanes with each of the V-shaped vanes and tubular vanes serving to introduce cooling ambient air completely across its duct structure portion and exhaust gases confined thereby and wherein the cooling ambient air introduced into each V-shaped vane is also utilized to provide cooling of a pair of opposed surfaces of an associated tubular vane.

Another feature of this invention is to provide an apparatus for and method of suppressing infrared radiation of the character mentioned wherein the downstream portion of the two portion duct structure has an outer housing made of a single thickness metal which has a plurality of openings defined completely through the metal housing to define a grater-like structure for introducing cooling ambient air directly from ambient by ejector action and about the entire periphery of the downstream portion.

Another feature of this invention is to provide an apparatus for and method of suppressing infrared radiation having an upstream portion and a downstream portion of the character described wherein each of such portions has a substantially rectangular cross-sectional configuration of increasing area in the direction of gas flow enabling easier construction of each portion.

Another feature of this invention is to provide an apparatus for and method of suppressing infrared radiation of the character mentioned wherein the upstream portion is basically an engine mounted component and the downstream portion is basically a vehicle mounted component enabling a substantial weight reduction for the entire apparatus due to the elimination of vibration isolation bellows and flanges.

Another feature of this invention is to provide an apparatus for and method of suppressing infrared radiation of the character mentioned wherein the tubular vanes in the downstream portion are basically made of single thickness metal and having openings therein which cooperate in sets to define an associated stream of cooling ambient air completely across the downstream portion of the duct structure and the openings are defined by elongated lanced slits.

Another feature of this invention is to provide in an apparatus for suppressing infrared radiation emitted from hot metal parts at the aft end of a gas turbine engine and from the exhaust gas plume thereof during engine operation comprising a dual purpose ejector vane assembly operatively associated with the engine for introducing cooling ambient air into the hot engine exhaust gases and hiding and cooling the hot metal parts and means supporting the vane assembly in operative association with the engine wherein the vane assembly comprises; a tubular duct structure for receiving and confining the engine exhaust gases; at least one vane providing at least one stream of cooling ambient air by ejector action completely across the duct structure to break the exhaust gases confined by the duct structure during engine operation into a plurality of separate exhaust gas streams and provide mixing of the one stream with the exhaust gases completely across the duct structure; the improvement wherein the duct structure is comprised of two cooperating portions defined by an upstream portion and a downstream portion with the upstream portion having a discharge end of a particular area and the downstream portion having an inlet end provided with an inlet area which is larger than the particular area to define an annular space therebetween for receiving cooling ambient air therethrough by ejector action during engine operation, and the two portion duct structure enables provision of the assembly having minimum weight and which supplies a substantial amount of cooling ambient air with maximum air film cooling of metal parts of the assembly and maximum dilution of the engine exhaust gas plume for a minimum infrared signal.

Therefore, it is an object of this invention to provide an apparatus for and method of suppressing infrared radiation emitted from hot metal parts at the aft end of a gas turbine engine and from the exhaust gas plume thereof during engine operation having one or more of the novel features set forth above or hereinafter shown or described.

Other objects, features, details, uses, and advantages of this invention will become apparent from the embodiment thereof presented in the following specification, claims, and drawings.

BRIEF DESCRIPTION OF THE DRAWINGS

The accompanying drawings show present preferred embodiments of this invention, in which FIG. 1 is a perspective view illustrating an exemplary helicopter aircraft which utilizes the apparatus and method of this invention for suppressing infrared radiation;

FIG. 2 is a plan view taken to one side of a center line through the exemplary apparatus of this invention, with that part of the apparatus on the other side of such center line being substantially identical;

FIG. 3 is an enlarged fragmentary view particularly illustrating openings in the form of slits in the housing of the downstream portion of the apparatus of FIG. 2 as well as in tubular vanes comprising such downstream portion with such slits serving to introduce cooling ambient air into the peripheral part of the exhaust gas stream and in streams extending completely across the exhaust gas stream;

FIG. 4 is a cross-sectional view taken essentially on the line 4—4 of FIG. 3;

DESCRIPTION OF ILLUSTRATED EMBODIMENTS

Figure 5:
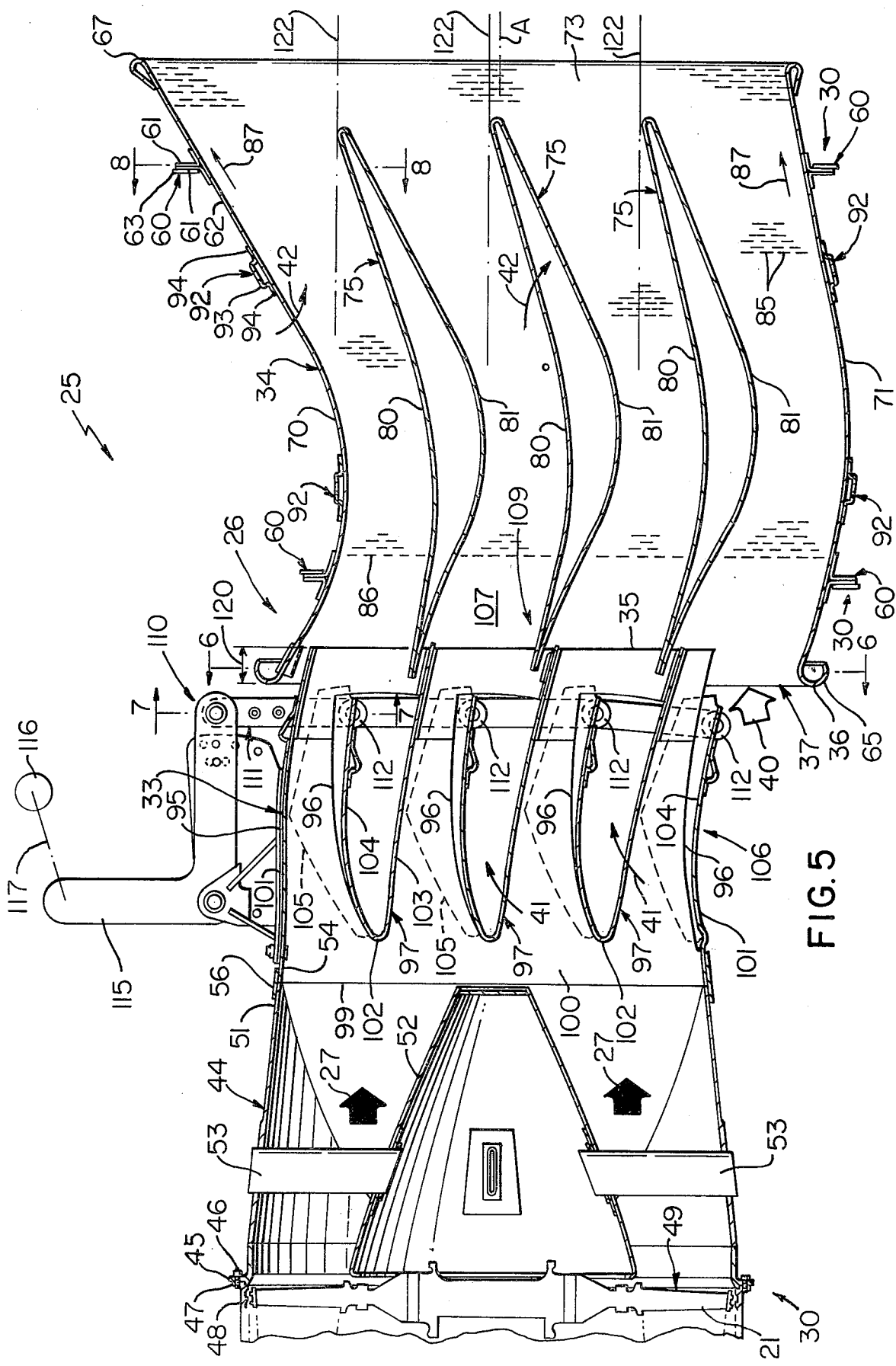
FIG. 5 is a cross-sectional view illustrating the entire apparatus and method of this invention and particularly illustrating details of both the upstream and downstream portions and vanes associated with each, and also illustrating the aft portion of an associated gas turbine engine.
Figure 6:
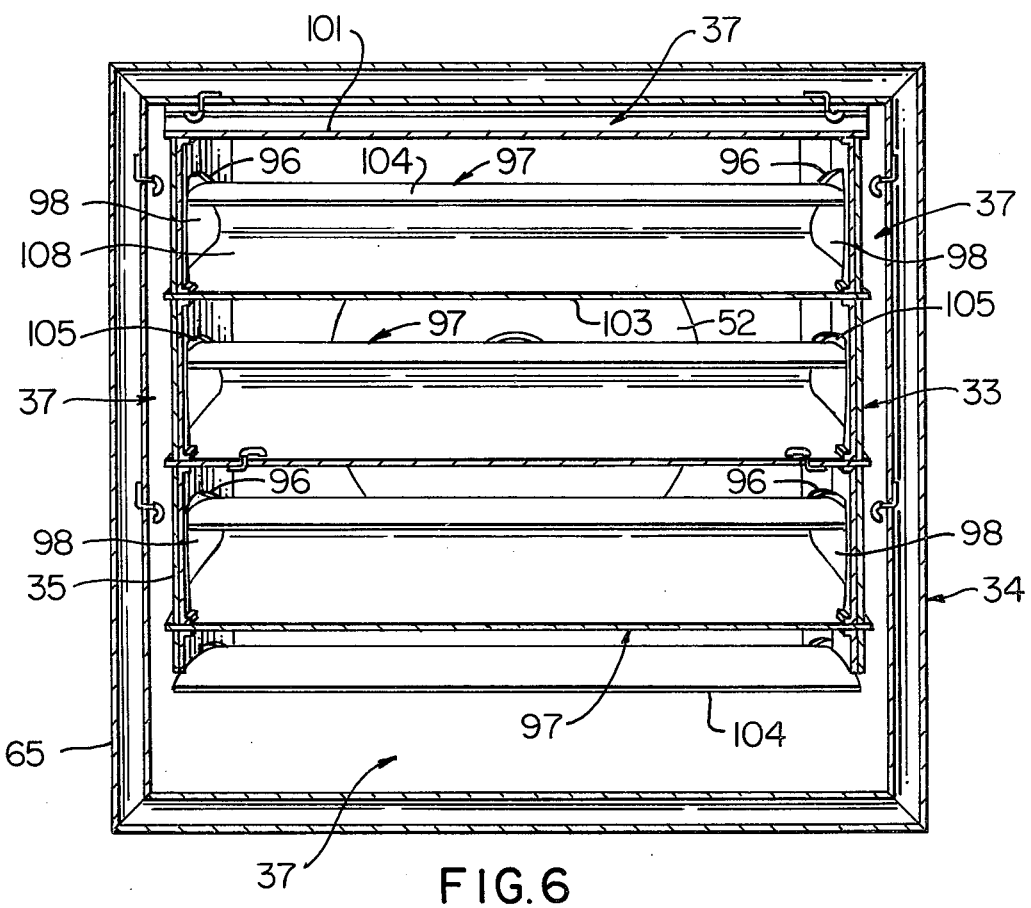
FIG. 6 is a view taken essentially on the line 6—6 of FIG. 5.
Figure 7:
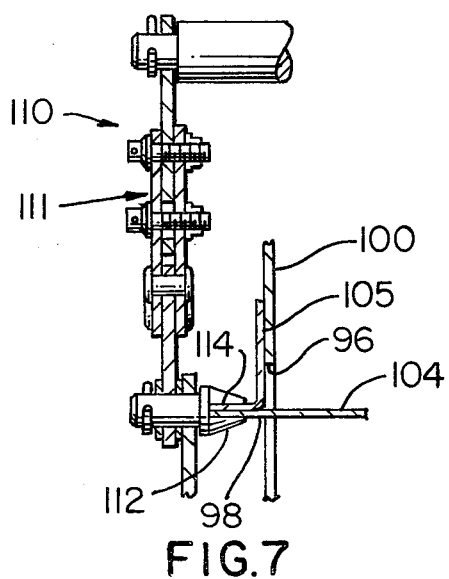
FIG. 7 is a view with parts in cross section, parts in elevation, and parts broken away taken essentially on the line 7—7 of FIG. 6.

Reference is now made to FIG. 1 of the drawings which illustrates an exemplary vehicle, shown as a helicopter 20, which is powered by a gas turbine engine 21 which is operatively connected as is known in the art to a lifting rotor assembly 22 which is suitably rotatably supported at the central top part of the helicopter fuselage 23 and the engine is also operatively connected to a stabilizing rotor assembly 24 which is also suitably rotatably supported in a tail section portion of the fuselage 23. The engine 21 employs an exemplary apparatus and method of this invention for suppressing infrared radiation emitted from hot metal parts at the aft end thereof and from its exhaust gas plume during engine operation and such apparatus and method are designated generally by the reference numeral 25.

As best seen in FIG. 5 of the drawings, the apparatus 25 comprises a dual purpose ejector vane assembly 26 for introducing cooling ambient air into the hot engine exhaust gases, which are designated by a few representative solid arrows 27, and hiding hot metal parts at the aft end of the gas turbine engine 21 and means designated generally by the reference numeral 30 supporting the vane assembly 26 in operative association with the engine 21.

The ejector vane assembly 26 is comprised of a tubular duct structure for receiving and confining the engine exhaust gases and the duct structure is comprised of two cooperating portions defined by an upstream portion 33 and a downstream portion 34. The upstream portion 33 has a discharge end 35 of a particular area and the downstream portion 34 has an inlet end 36 which basically surrounds end 35, i.e., is disposed radially outwardly of end 35 at each circumferential position of end 36 and regardless of whether end 36 is axially spaced from end 35 on a common longitudinal axis, whereby end 36 has an inlet area which is larger than the particular area of the discharge end 35 to define an annular area or space 37 between the upstream portion 33 and downstream portion 34. The annular space 37 serves as an inlet for receiving cooling ambient air therethrough by ejector action during engine operation with such cooling ambient air being designated by a representative reference arrow 40. The air 40 introduced through annular space 37 cooperates with cooling ambient air introduced through the upstream portion 33 also by ejector action and designated by a few representative reference arrows 41 and further cooperates with cooling ambient air introduced by ejector action through the downstream portion 34 and designated by a few representative reference arrows 42 to provide a minimum infrared radiation signal from engine 21 yet using only fixed parts and avoiding use of complicated components such as pumps, compressors, motors, and the like to provide cooling air and also avoiding use of specially stored cooling gases.

Figure 9:
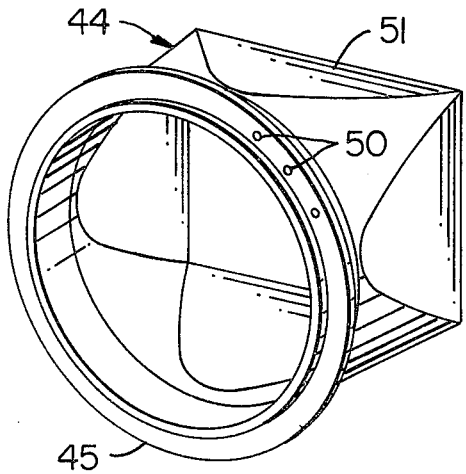
FIG. 9 is a perspective view of a transition duct structure which also comprises support means for supporting the upstream portion of the assembly on the engine.

The vane assembly 26 is supported in operative association with the engine 21 by the previously mentioned supporting means 30; and, the engine 21 may be any known type of gas turbine engine suitable for powering a helicopter 20. The supporting means 30 comprises a tubular transition duct structure 44 which is provided with a circular inlet end (FIGS. 5 and 9) portion and a flange 45 of circular outline which is attached by threaded bolts 46 to a radially projecting flange 47 of the engine turbine housing 48 immediately downstream of the turbine 49 of such engine employing cooperating threaded openings 50 in flange 47. The transition duct has a downstream end portion 51 of rectangular outline which has the upstream portion 33 suitably fixed thereto as will be described later; and, the engine 21 has a central bullet nosed section 52 which is supported by a plurality of hollow weblike struts 53 downstream of the turbine 49 and the struts 53 have their outer ends fixed to the transition duct 44.

The upstream portion 33 of the ejector vane assembly 26 has a tubular forward part 54 of rectangular peripheral outline which corresponds to rectangular end portion 51 of the transition duct 44. The rectangular portions 51 and 54 are placed in abutting relation and a tubular band 56 is suitably fixed to both portions 51 and 54 as by welding, or the like, whereby the upstream portion 33 is supported in a contilevered manner solely by the engine structure and components 44 and 56 which comprise the supporting means 30 of the assembly 26.

Figure 8:
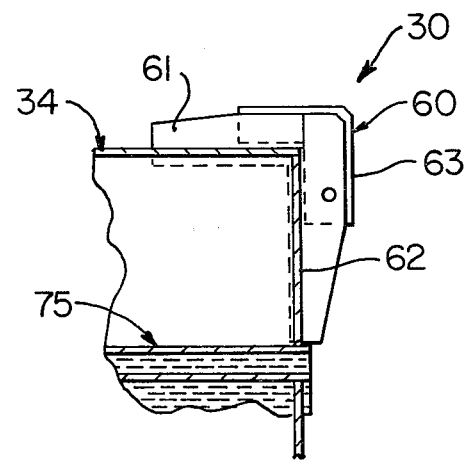
FIG. 8 is a fragmentary view taken essentially on the line 8—8 of FIG. 5.

The supporting means 30 for assembly 26 also includes supports for the downstream portion 34 which supports same independently of the upstream portion and as seen in FIGS. 5 and 8. The independent supports for the downstream portion 34 comprise a plurality of structural support bracket assemblies each designated by the same reference numeral 60. Each bracket assembly 60 comprises a pair of substantially L-shaped members 61 which are suitably fixed to the enclosing or housing structure 62 of the downstream portion 34 as by welding or the like. The independent supports for portion 34 also include a support member 63 associated with each pair of members 61. Each member 63 is suitably fixed to the structural portion of the fuselage 23 of helicopter 20 and to an associated set of members 61. The bracket assemblies 60 are the sole means used to support the downstream portion 34.

From the above description, it is seen that the downstream portion 34 is supported by independent bracket assemblies 60 and the upstream portion 33 is supported solely from the engine structure whereby it is possible to provide supporting components of portions 33 and 34 made of lighter weight materials. In addition, it is possible with this separate mounting of portions 33 and 34 to eliminate vibration isolation bellows and flanges and special high performance supports resulting in smaller loads being imposed on the basic engine structure.

As seen in FIG. 5 of the drawings, the inlet end 36 of downstream portion 34 has a rounded inlet portion 65 of approximately semicircular cross-sectional outline which provides smooth entry of cooling ambient air 40 into the inlet end 36 and also serves as a semitoroidal tubular reinforcement. Similarly, the terminal end of the downstream portion 34 has a rounded discharge lip 67 defining its outlet end which also serves to reinforce the terminal edge portion of the downstream portion 34.

Figure 11:
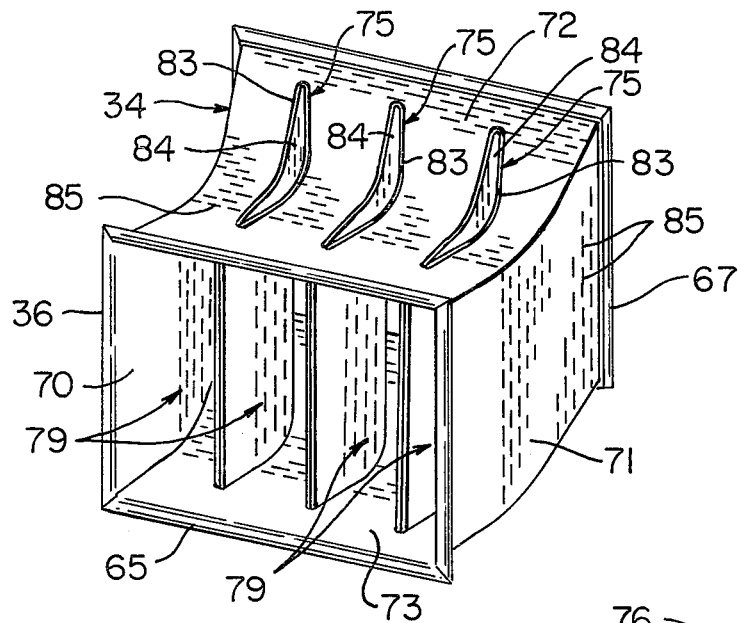
FIG. 11 is a perspective view primarily illustrating the overall arrangement of the downstream portion and its tubular vanes.

The downstream portion 34 is comprised of a plurality of four main walls serving as confining or housing walls for engine exhaust gases and cooling ambient air at the downstream part of the ejector vane assembly; and, the four main walls are arranged in two opposed or oppositely arranged pairs having walls 70 and 71 in one pair and walls 72 and 73 in the other pair. As seen in FIGS. 5 and 11, each of the walls 70 and 71 has an undulating configuration which in this example is of different contour; and, each of the walls 72 and 73 has an approximately flat configuration. The walls pairs 70-71 and 72-73 diverge from each other in a rearward direction away from the engine 21 whereby the cross-sectional area of the downstream portion 34 increases as the distance rearwardly from the engine 21 increases.

Figure 12:
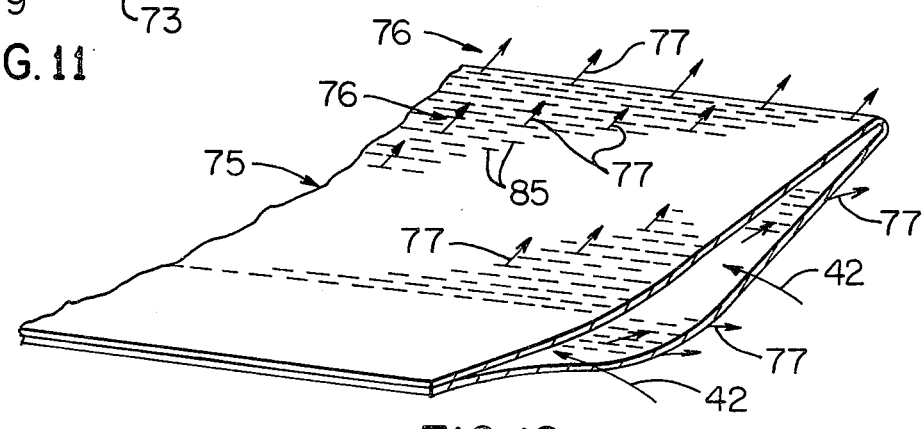
FIG. 12 is a perspective view of a typical tubular vane of the downstream portion.

The downstream portion 34 has a plurality of tubular vanes each designated by the same reference numeral 75 and each extending across the full dimension of the downstream portion 34, between walls 72 and 73 in this example, FIGS. 5, 11, and 12. Each vane 75 is supported at its terminal opposed end portions by walls 72-73 and provides at least one stream, and in this example a plurality of streams, of cooling ambient air across the full dimension of the downstream portion 34 of the duct structure and hence across the full dimension of the exhaust gases confined by such duct structure. Typical ones of such streams are shown in FIG. 12 of the drawings and each is designated generally by the reference numeral 76. Each stream 76 is comprised of a plurality of cooperating jets, designated by arrows 77, of cooling ambient air which are aligned in parallel relation and in an approximately rectilinear path across an associated vane 75 between its walls 72-73.

As seen in FIG. 5 of the drawings a plurality of three tubular vanes 75 are provided in the downstream portion 34 and each tubular vane is in the shape of a hollow air foil. The vanes 75 are substantially identical and each is defined by a pair of cooperating undulating walls 80 and 81. The vanes 75 have opposite end portions, each designated by the same reference numeral 83, fixed to the diverging walls 72 and 73 (FIG. 11); and, the three vanes 75 divide the volume between the pair of undulating walls 70 and 71 into a plurality of four roughly equal volume chambers and each of such chambers is designated by the same reference numeral 79.

The opposite end portions 83 have open ends 84 and each portion 83 extends through an associated wall, either 72 and 73, so that the open ends 84 are exposed to ambient air. Thus, each tubular vane 75 introduces cooling ambient air through its open ends 84 in a direction substantially perpendicular to the walls 72 and 73 and the cooling ambient air is turned approximately 90 degrees from such perpendicular direction by the vane so that it flows axially along the assembly 26.

Each vane 75 has its walls 80-81 preferably made of single thickness metal and each wall 80-81 has opening means therein defined by a plurality of slits 85. Each slit 85 may be a pierced or lanced slit which defines an associated air jet 77 and the slits 85 are disposed in aligned relation as described in detail in the description of jets 77 whereby a plurality of slits 85 and hence air jets 77 defined thereby define an associated stream 76 as illustrated in FIG. 12. Each tubular vane 75 introduces cooling ambient air through its open ends 84 in a direction substantially perpendicular to the walls 72 and 73 thereof and the cooling ambient air is turned by an associated tubular vane 75 and provided into the central part or area of the exhaust gases 27 flowing through the downstream portion 34 and in a plurality of roughly parallel streams 76 as previously described. The streams, in essence, extend across the full width or dimension of exhaust gases flowing through the downstream portion as partially cooled by cooling ambient air introduced upstream of the downstream portion 34.

The housing walls of the downstream portion 34 of the ejector vane assembly 26 also have opening means in the form of slits, preferably lanced slits, which are also designated by the reference numerals 85. The slits 85 are provided in substantially the entire outer periphery of walls 70, 71, 72, and 73 defining such housing structure and from the dotted lines 86 (FIG. 5) to the terminal end of the downstream portion 34. The slits 85 in the walls 70–73 define the downstream portion 34 into a graterlike structure and slits 85 introduce additional jets 77 of cooling ambient air, an air jet 77 for each slit, by ejector action during engine operation and define a tubular blanket 87 of air about the entire periphery of the downstream portion 34. It will be appreciated that the ejector action is provided through the slits 85 to define air jets 77 by the aspirating action produced by the high velocity stream of gases within the downstream portion. Cooling ambient air is drawn through the open ends 84 of the tubular vanes 75 to define the air jets 77 and streams 76 and is drawn from the space surrounding the downstream portion 34 to define tubular blanket 87.

To assure that the walls 70–73 of the tubular downstream portion 34 are of adequate strength due to the fact that slits 85 have been provided therethrough, a plurality of reinforcing channel members are provided for walls 70–73 and each designated by the same reference numeral 92. Each channel member 92 is comprised of a U-shaped portion 93 and a pair of fastening flanges 94 extending from opposite ends of the U-shaped portion 93 in opposed directions. The channel members 92 are suitably fixed to an associated wall in spaced relation, by welding or the like, and in particular the flanges 94 in each member 92 are fixed to an associated wall with the members of such wall disposed in parallel relation.

Figure 10:
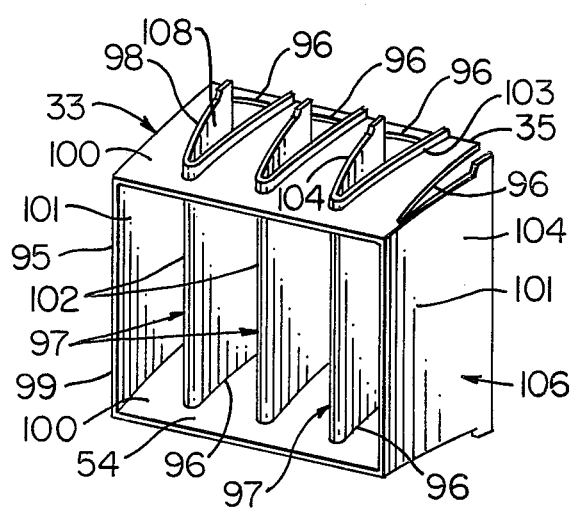
FIG. 10 is a perspective view primarily illustrating the overall arrangement of the upstream portion and its V-shaped vanes.

The upstream portion 33 of the ejector vane assembly 26 comprises an enclosing or housing wall structure which is designated generally by the reference numeral 95 (FIGS. 5 and 10) and such housing structure is basically a non-perforated, i.e., free of slits 85, tubular structure but has cooperating pairs of openings therein each designated by the reference numeral 96 and as will be described later. The upstream portion 33 has at least one roughly V-shaped vane disposed therein and in this example has a plurality of three complete roughly V-shaped vanes each designated generally by the reference numeral 97. Each vane 97 has opposite end portions 98 which extend through a pair of associated openings 96 in the tubular structure 95 and each end portion 98 is suitably fixed thereto as will be explained later.

The housing structure 95 has a rectangular inlet portion 99 and its previously mentioned discharge end 35 is also of rectangular outline. The housing structure 95 has an opposed pair of cooperating walls 100 at its sides and an opposed pair of cooperating walls 101 at the top and bottom thereof, as viewed in FIG. 10. The openings 96 are defined in walls 100.

Each V-shaped vane 97 extends completely across the upstream portion 33 with its portions 98 through its openings 96 and each vane 97 has an apex 102 of a smooth rounded configuration which faces upstream toward the engine 21. Each vane 97 has a pair of legs 103 and 104 diverging therefrom and in this example of the invention the leg 103 is disposed in a fixed position while the leg 104 of each vane 97 is preferably movable.

Each opening 96 is of larger area than the outline (viewed from an end thereof) of an associated V-shaped vane 97 thereby enabling easy installation of end portions 98 in openings 96. In addition each leg 104 has a pair of plates 105, which serve as movable air valves, fixed to its opposite ends and movable therewith. Each plate 105 slides against the outside surface of its associated wall 100 so that as each leg 104 in moved toward its other leg 103, in a manner to be subsequently described, the plates 105 on opposite sides of the upstream portion close off the unused portions of their openings 96.

The upstream portion 33 also has what amounts to only one leg of a V-shaped vane defining one of its walls 101 as shown at 106 and such leg 104 operatively associates with a pair of openings 96 in walls 100. In a similar manner as previously described for leg 104 of a vane 97, the movable leg 104 shown at 106 is moved in a simultaneous manner with the other legs 104 of the V-shaped vanes 97 and the vane at 106 controls the flow of cooling ambient air in the vicinity of the wall 71 of the downstream portion 34 of the ejector assembly 26.

During engine operation hot engine exhaust gases 27 flow through the upstream portion 33 and around the V-shaped vanes 97. The volume adjacent the terminal ends of the legs 103 and 104 of each V-shaped vane 97 is disposed closely adjacent the annular area 37 and as the hot exhaust gases 27 flow around the legs 103 and 104 a low pressure area is created in the vicinity 107 downstream of legs 103 and 104 causing cooling ambient air to be drawn through opposed open ends 108 of the vanes 97 by ejector action.

The V-shaped vanes 97 in the upstream portion 33 are disposed therein relative to each other and relative to the tubular vanes 75 in the downstream portion such that cooling ambient air discharging from a V-shaped vane 97 flows against a pair of opposed surfaces 80 and 81 of an associated tubular vane 75; and, as shown at 109, for example, for the central V-shaped vane 97 and in its associated central tubular vane 75. Preferably the cooling ambient air discharging from each V-shaped vane 97 is introduced relative to its tubular vane 75 so that the major volume thereof is on the so-called pressure side of vane 75 and hence flows along the surface 80 while a comparatively smaller volume thereof flows along the so-called suction side of vane 75 and hence flows along the surface 81 thereof. It has been found that best results are obtained by providing between 15 and 30 percent of the cooling ambient air from each vane 97 along the surface 81 and with the remaining percentage of 85 to 70 respectively along the surface 80 of an associated vane 75.

The cooling ambient air flowing through V-shaped vanes 97 provides cooling and plume dilution as well as film cooling of surfaces 80 and 81 of the tubular vanes 75. These results are possible due to the provision of V-shaped vanes in the upstream portion 33 of the ejector vane assembly 26 and tubular vanes 75 in the downstream portion 34 and the constructing and arranging of these portions and vanes in the manner described. In addition to flow of cooling ambient air through vanes 97 and 75, also with the defining of streams 76, cooling ambient air is introduced through annular area 37 and through slits 85 in walls 70–73 to define tubular blanket 87 whereby the overall ejector vane assembly 26 operates with optimum effeciency and has an infrared signal generally of the order of 8 to 10 percent less than the apparatus of the type disclosed in U.S. Pat. No. 4,007,587.

Thus, it is seen that the apparatus 25 of this invention provides an ejector vane assembly 26 comprised of an upstream portion 33 and a downstream portion 34 as described above and each of these portions introduces cooling ambient air therein with the upstream portion introducing cooling ambient air, by means of its V-shaped vanes 97 completely across the exhaust gas stream and hence the tubular housing of portion 33; and, with the downstream portion 34 introducing cooling ambient air by means of a tubular vanes 75 having slits 85 defining air streams 76 completely across the housing walls of portion 34 and slits 85 in the peripheral walls 70–73 defining the tubular blanket 87. In addition, the separation of the downstream portion 34 from the upstream portion 33 with the provision of the annular space 37 therebetween provides another source of cooling ambient air and this other source is in the form of an annular stream of cooling ambient air introduced between the upstream portion 33 and downstream portion 34. Accordingly, all of these sources of cooling ambient air result in an apparatus and method which reduces the infrared signal substantially and of the magnitude indicated above. Further, the ejector vane assembly 26 is free of moving parts. The overall construction made possible by separation of portions 33 and 34 and the unique features thereof result in an improved infrared cooling effeciency as desired above. Further, the use of the supporting means 30, previously described, and portions 33–34 results in the apparatus 25 having roughly 30 percent less weight and cost than the apparatus of U.S. Pat. No. 4,007,587.

The apparatus 25 and in particular the ejector vane assembly 26 thereof may be provided with means for controlling the amount of cooling ambient air introduced therein and such means is designated generally by the reference numeral 110 in FIG. 5 of the drawing. The cooling air control means 110 is provided in the upstream portion 33 and as is well known in the art during non-threatening conditions the amount of cooling ambient air introduced into the assembly 26 is kept at a minimum. Under threatening conditions, when an enemy is attempting to deploy a heat seeking missile, the cooling air control means 110 is actuated to introduce more cooling ambient air into the assembly 26 and this is achieved by moving the movable leg portions 104 of the V-shaped vanes 97 and the leg 104 at 106 in FIG. 5.

The control means 110 comprises a pair of a linkage assemblies each designated generally by the reference numeral 111 and each associated with an end portion of a leg 104. Each linkage assembly 111 has a leg engaging and moving component 112 which comprises a head portion having a slot 114 therein for receiving an associated terminal end portion of an associated leg 104 without providing stress in such leg portion, or otherwise subjecting the same to stress inducing aperatures or other areas likely to cause failure. Each slot 114 in addition to receiving an associated terminal end portion of an associated leg 104 therein also receives a portion of an associated plate 105. The linkages 111 are then suitably actuated by actuating lever mechanisms 115 connected thereto to thereby move each of the legs 104 either toward or away from its associated leg 103 and thereby control the area of the rectangular outlet opening defined by the edges of associated legs 103 and 104. The plate 105 associated with a particular leg 104 serves as a valve closing that part of its associated opening 96 disposed outwardly of its leg 104 and as previously mentioned. The lever mechanisms 115 may be suitably interconnected and operated by either manual or automatic means of any suitable type which may include a suitable motor 116 operatively connected by a linkage mechanism designated schematically by a dotted line 117 to each lever mechanism 115.

The ejector vane assembly 26 is a fixed construction at any operating position thereof and thus free of moving parts, i.e., parts such as pumps and compressors, for example, which must move to provide cooling air flow. However, the control means 110 provides means for adjusting the positions of legs 104 to a plurality (basically an infinite number) of fixed positions; and, once moved to a particular fixed position, the ejector vane assembly 26 operates to provide flow of cooling ambient air through fixed parts.

The transition duct structure 44 is primarily a simple structure of single thickness walls. The tubular wall or housing of the upstream porton 33 is defined by simple walls 100 and 101 free of compound curves, or the like. Similarly, the downstream portion 34 is also defined by simple walls 70, 71, 72 and 73 free of compound curves.

In this disclosure of the invention, the upstream portion 33 has its terminal downstream end telescoped within the downstream portion 34 by a distance 120 as indicated in FIG. 5. However, it will be appreciated that portions 33 and 34 need not be telescoped together in this manner and indeed the terminal downstream end of the upstream portion 33 may be disposed so that it coincides with a plane through the terminal forward end 36 of the downstream portion 34. In addition, the upstream portion and downstream portions may be separated, i.e., spaced apart along a central longitudinal axis through apparatus 25 by a distance or axial gap ranging from a fraction of an inch to several inches and in this latter instance somewhat more cooling ambient air will be introduced not only through the annular area 37 but also through the axial gap provided between portions 33 and 34. It will be appreciated that the only limiting factors on the disposal and construction of portions 33 and 34 are that the discharge area at the discharge end 35 of the upstream portion 33 must be smaller than the area at the inlet end 36 of portion 34 and all parts of end 35 must be within the confines of end 36 so that all exhaust gases will be received thereby.

The ejector vane assembly 26 has a minimum overall length and frontal area and a roughly 5 L/D ejector mixing length has been established for optimum ejector performance where L is defined as the developed axial length of portion 34 and D as the effective hydraulic diameter of portion 34. The length of assembly 26 is further minimized by the air-foil shaped tubular vanes 75 and the numerous streams and blankets of cooling ambient air provided solely by ejector action by the cooperating components of assembly 26.

The ejector vane assembly 26 operates at all air flows with minimum likelihood of malfunction due to all cooling ambient air being provided by ejector action using components which are free of moving parts such as belts, motors, and the like.

Further, the air-foil shaped vanes 75 are basically of modular construction and are substantially identical and interchangeable whereby the cost of fabricating such vanes is kept at a minimum. The vanes 75 are also readily accessible for easy repair.

As seen in FIG. 5 of the drawings, the air-foil shaped vanes 75 and the walls 70 and 71 have rear portions which are inclined at certain angles of inclination relative to a longitudinal axis A through the apparatus 25. However, the aft portion of each wall 70 and 71 and vane 75 may be inclined at any desired angle relative to the axis A and depending on the application the angle may range between 20° and 45°.

As indicated above the vane assembly 26 serves the dual purpose of providing cooling ambient air by ejector action as well as hiding of hot metal parts. The assembly 26 provides cooling ambient air as described earlier. The assembly 26 provides hiding of hot metal parts as will be readily apparent from a typical pair of lines of sight each indicated by dot-dash lines 122 in FIG. 5.

The entire apparatus 25 may be rotated about its central longitudinal axis A any desired amount so that fluid exiting therefrom may be directed upwardly relative to the fuselage or horizontally to the left or right above such fuselage or at some other angle, as desired. Further, the apparatus 25 may be made employing any suitable material used in the art to make this type of structure; and the size thereof will vary depending upon the size engine employed and the aircraft application.

While present exemplary embodiments of this invention, and methods of practicing the same, have been illustrated and described, it will be recognized that this invention may be otherwise variously embodied and practiced within the scope of the following claims.

What is claimed is:

1. In an apparatus for suppressing infrared radiation emitted from hot metal parts at the aft end of a gas turbine engine and from the exhaust gas plume thereof during engine operation comprising:

a dual purpose ejector vane assembly operatively associated with said engine for introducing cooling ambient air into the hot engine exhaust gases and hiding said hot metal parts and means supporting said vane assembly in operative association with said engine wherein said vane assembly further comprises:

a tubular duct structure for receiving and confining said engine exhaust gases consisting of two cooperating portions defined by an upstream portion and a downstream portion, said upstream portion having a discharge end of a particular area, said downstream portion having an inlet end provided with an inlet area which is larger than said particular area to define an annular space therebetween for receiving additional cooling ambient air therethrough by ejector action during said engine operation; and at least one tubular vane constructed in said downstream portion providing at least one stream of cooling ambient air completely across said downstream portion to mix with the exhaust gases confined thereby, said tubular vane being constructed of a single thickness metal sheet which has aligned slits therein defining air jets which cooperate to emit by ejector action the stream of cooling ambient air.

2. In an apparatus as set forth in claim 1 the further improvement in which each of said slits is a lanced slit.

3. In an apparatus as set forth in claim 1 the further improvement wherein said downstream portion is comprised of a plurality of cooperating confining walls and each of said walls has a plurality of openings therein for introducing additional cooling ambient air by ejector action about the entire periphery of said downstream portion.

4. In an apparatus as set forth in claim 3 the further improvement wherein said downstream portion has said plurality of openings defined therein in the form of elongated slits and said additional cooling ambient air is defined as a tubular blanket of cooling ambient air about the gases confined by said downstream portion for additional mixing therewith and cooling thereof.

5. In an apparatus as set forth in claim 1 the further improvement comprising at least one roughly V-shaped vane disposed in said upstream portion and extending completely across said upstream portion and the exhaust gases confined thereby, said V-shaped vane having an apex facing upstream toward said engine and having a pair of legs diverging therefrom, said V-shaped vane introducing cooling ambient air by ejector action through open ends thereof and against a pair of opposed surfaces of said tubular vane to help provide film cooling of said opposed surfaces.

6. In an apparatus as set forth in claim 5 the further improvement wherein said upstream portion has housing wall means and a pair of openings in said housing wall means at opposed positions thereof placing opposite ends of said V-shaped vane in flow communication with ambient air for introducing cooling ambient air therein, each of said openings being of larger area than the end outline of an associated V-shaped vane thereby enabling easy installation of opposite end portions of each vane through said pair of opposed openings, and a pair of plates fixed to opposite end portions of one of said legs and being movable therewith, each plate slidably engaging the outside surface of said housing wall means and as said one leg is moved toward its other leg the plates on opposite sides of the upstream portion close off the unused portions of their associated openings.

7. In an apparatus as set forth in claim 1 and further comprising at least another substantially identical tubular vane in said downstream portion, said tubular vanes dividing said downstream portion into a plurality of substantially equal volumes, the further improvement comprising a plurality of roughly V-shaped vanes corresponding in number to said tubular vanes and being disposed in said upstream portion while extending completely across said upstream portion and the exhaust gases confined thereby, each V-shaped vane having an apex facing upstream toward said engine and having a pair of legs diverging therefrom, each V-shaped vane introducing cooling ambient air by ejector action against a pair of opposed surfaces of an associated tubular vane to help provide film cooling of the associated opposed surfaces.

8. In an apparatus as set forth in claim 7 wherein each of said tubular vanes has a pressure side and a suction side the further improvement wherein 15-30 percent of cooling ambient air from each V-shaped vane flows along the suction side of its associated tubular vane with the remaining percent flowing along the pressure side of the associated tubular vane.

9. In an apparatus as set forth in claim 8 the further improvement wherein said upstream portion is telescoped partially within said downstream portion to define said annular space having a substantial area.

10. In an apparatus as set forth in claim 7 the further improvement wherein each of said tubular vanes provides a plurality of streams of cooling ambient air by ejector action which are disposed in substantially parallel relation to said one stream, said plurality of streams from said tubular vanes extending completely across said downstream portion to break the exhaust gases confined by said downstream portion during engine operation and provide substantial dilution of said exhaust gases with said cooling ambient air.

11. In an apparatus as set forth in claim 10 the further improvement wherein each of said tubular vanes is defined of single thickness metal which has aligned slits therein defining air jets which cooperate to define each of said streams of cooling ambient air provided from each tubular vane.

12. In an apparatus as set forth in claim 11 the further improvement in which each of said slits is a lanced slit.

13. In an apparatus as set forth in claim 11 the further improvement wherein said downstream portion is comprised of a plurality of four cooperating single-thickness confining walls and each of said walls has a plurality of elongated slits therein for introducing additional cooling ambient air by ejector action about the entire periphery of said downstream portion as a tubular blanket.

14. In an apparatus as set forth in claim 11 the further improvement wherein at least one of said pair of legs of each V-shaped vane is movable toward and away from the other leg of its pair to change the area bounded by said legs and thereby change in a corresponding manner the amount of cooling ambient air introduced through the associated V-shaped vane.

15. In an apparatus as set forth in claim 14 the further improvement comprising means for moving said one of said pair of legs of each V-shaped vane toward and away from the other leg of its pair.

16. In an apparatus as set forth in claim 15 the further improvement wherein said moving means comprises at least one linkage assembly, said linkage assembly having a plurality of leg engaging and moving components each of which comprises a device having a slot therein for receiving a portion of an associated leg therewithin enabling movement of the associated leg by a pair of opposed surfaces defining the slot, each pair of opposed surfaces providing movement of its leg while maintaining the leg free of stresses.

17. In an apparatus as set forth in claim 11 the further improvement comprising means supporting said upstream portion and said downstream portion independently of each other.

18. In an apparatus as set forth in claim 17 the further improvement comprising at least one flange supporting said upstream portion on said engine and a plurality of bracket assemblies supporting said downstream portion in a vehicle having said engine mounted thereon.

19. In an apparatus as set forth in claim 1 wherein said downstream portion is comprised of a plurality of cooperating walls, the further improvement comprising opening means in said cooperating walls defining a grater-like structure which serves to provide a tubular blanket of cooling ambient air by ejector action around the gases flowing through said downstream portion for mixing therewith and further dilution thereof.

20. In a method of suppressing infrared radiation emitted from hot metal parts at the aft end of a gas turbine engine and from the exhaust gas plume thereof during engine operation comprising the steps of:
attaching a dual purpose ejector vane assembly to the aft end of said engine to receive hot engine exhaust gases therethrough and hide said hot metal parts, said vane assembly comprising a fluid confining duct structure;
providing said duct structure as two cooperating portions defined by an upstream portion and a downstream portion, said upstream portion having a discharge end of a particular area, said downstream portion having an inlet end provided with an inlet area which is larger than said particular area, disposing said discharge end of said upstream portion adjacent said inlet end to define an annular space therebetween for receiving additional cooling ambient air therethrough by ejector action during said engine operation, said two portion duct structure resulting in a substantial reduction in both the amount of emitted infrared radiation and the total weight of said assembly; and
introducing a plurality of streams of cooling ambient air completely across said duct structure by employing at least one tubular vane in said downstream portion and film cooling a pair of opposed surfaces of said tubular vane with cooling ambient air from a roughly V-shaped vane in said upstream portion to break the exhaust gases confined by the duct structure during engine operation into a plurality of exhaust gas streams and provide optimum mixing of said one stream with said exhaust gases completely across said duct structure.

21. In a method as set forth in claim 20 the further improvement comprising flowing a tubular blanket of cooling ambient air around the gases confined by said downstream portion for additional mixing therewith and cooling thereof.

22. In a method as set forth in claim 20 the further improvement comprising supporting said upstream portion and said downstream portion independently of each other.

23. In a method as set forth in claim 22 the further improvement comprising supporting said upstream portion entirely on said engine and supporting said downstream portion entirely on a vehicle which carries said engine.

* * * * *